(12) United States Patent
Onodera et al.

(10) Patent No.: US 8,767,017 B2
(45) Date of Patent: Jul. 1, 2014

(54) DISPLAY DEVICE

(75) Inventors: Shinji Onodera, Yokohama (JP); Koichi Atsuta, Yokohama (JP); Yusuke Mukai, Kawasaki (JP); Kenichi Iwahara, Kamakura (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 661 days.

(21) Appl. No.: 12/365,465

(22) Filed: Feb. 4, 2009

(65) Prior Publication Data

US 2009/0213130 A1 Aug. 27, 2009

(30) Foreign Application Priority Data

Feb. 22, 2008 (JP) ................... 2008-040820

(51) Int. Cl.
*G09G 5/00* (2006.01)
(52) U.S. Cl.
USPC .......................................... 345/641; 345/96
(58) Field of Classification Search
None
See application file for complete search history.

(56) References Cited

U.S. PATENT DOCUMENTS

| | | | | |
|---|---|---|---|---|
| 5,790,264 A | * | 8/1998 | Sasaki et al. | 358/426.11 |
| 2005/0110871 A1 | * | 5/2005 | Ida | 348/173 |
| 2005/0219430 A1 | * | 10/2005 | Nagano | 349/9 |
| 2005/0271274 A1 | * | 12/2005 | Urano et al. | 382/173 |
| 2007/0035706 A1 | * | 2/2007 | Margulis | 353/122 |
| 2010/0149227 A1 | * | 6/2010 | Tomizawa et al. | 345/694 |

FOREIGN PATENT DOCUMENTS

| | | |
|---|---|---|
| JP | 2005-250391 | 9/2005 |
| WO | WO 2006093163 A1 * | 9/2006 |

OTHER PUBLICATIONS

Anonym, Manual of Panasonic VCR model PV-V4525S.*

* cited by examiner

*Primary Examiner* — Ke Xiao
*Assistant Examiner* — Weiming He
(74) *Attorney, Agent, or Firm* — McDermott Will & Emery LLP (57) ABSTRACT

In a display device provided with a frame memory developing an auxiliary line image as a display image and a means of reading out and displaying the image data developed in the aforementioned frame memory, the aforementioned auxiliary line image is constituted by background pixels and dashed auxiliary lines constituted by pixels which have luminance or color that is different from that of the background color and pixels with have nearly identical luminance or color to that of the background color; and by carrying out the display of the dashes so as to move, at fixed time intervals or arbitrary time intervals, the dash display areas of the aforementioned auxiliary lines on the trajectory of the figure described by the aforementioned auxiliary lines, the system is devised to display the auxiliary lines while controlling that an identical pixel of the display device is not displayed continually.

10 Claims, 10 Drawing Sheets

DISPLAY DEVICE

BACKGROUND OF THE INVENTION

1. Field of the Invention

The present invention is one that pertains to technology providing a display device.

2. Description of the Related Art

In recent years, along with the spread of Personal Computers as well as IT (Information Technology) infrastructure development, projection type image display devices, starting with projectors, have spread with high speed in various settings such as at conference presentations and for lectures at education sites.

Moreover, accompanying the spread, the trend toward higher luminance is advancing together with a reduction in price. As a result hereof, since it has not been possible in the past to obtain sufficient brightness for display images of projection type image display devices, it has been necessary to project on a dedicated screen to make the projection. Under present conditions, since it is possible to procure projection type image display devices comparatively inexpensively and with high luminance, it is possible to ensure sufficient brightness even without making a projection on a dedicated screen, so cases in which projections are made on recording facilities such as whiteboards and blackboards have also gradually become more numerous.

On the other hand, a recording facility onto which a projection is made is an important tool with which tables and characters are recorded to carry out communication of intent, but since there are different objectives at the time of recording, there is a situation in which it cannot be said that guide displays such as to make tables easy to write or record characters by alignment in either the horizontal or vertical direction are sufficient. As far as whiteboards are concerned, there are box-shaped guide displays or printed guide letters which are put to practical use as recording aids, but since the objectives of use at the time of recording are diverse, the situation is one which cannot be said to be sufficient.

Accordingly, the situation is one in which settings of use where a projection type image display device projects onto the aforementioned facility to display an image are becoming numerous and it is possible to display arbitrary auxiliary lines from the projection type image display device to carry out assistance in recording. Regarding the concerned functionality, it is one that is disclosed in JP-A-2005-250391.

SUMMARY OF THE INVENTION

Regarding JP-A-2005-250391, as things stand today, it only covers a test pattern display for aligning a projected image position with respect to a screen.

As for the display of auxiliary lines targeting assistance in recording, there is a need to hold the display position for a long time, but as far as liquid crystal devices used in projection type image display devices are concerned, there is, in the case of displaying a luminance or a color that is different from the background region for a long time in the same position, the problem that a persistent image (burn-in) occurs, since a DC voltage component remains. Consequently, in this invention, a way of solving this problem is regarded as an issue requiring attention.

With respect to the aforementioned problem, in the present invention, the system is devised, in a display device provided with a frame memory developing an auxiliary line image as a display image and a means of reading out and displaying the image data developed in the aforementioned frame memory, so that the aforementioned auxiliary line image is constituted by background color and dashed auxiliary lines constituted by pixels which have luminance or color that is different from that of the background color and pixels with have nearly identical luminance or color to that of the background color.

By carrying out the display of the dashes so as to move, at fixed time intervals or arbitrary time intervals, the dash display areas of the aforementioned auxiliary lines on the trajectory of the figure described by the aforementioned auxiliary lines, the system is devised to display the auxiliary lines so that the display of an identical pixel of the display device is reduced.

Also, the system is devised to carry out display of auxiliary lines, so that, at fixed time intervals or arbitrary time intervals, for the dash display areas of the auxiliary lines, the pixel areas whose luminance or color differs from that of the background color are changed into a luminance or color that is nearly identical to that of the background color and, moreover, the pixel areas whose luminance or color is nearly identical to that of the background color are changed into a luminance or color that differs from that of the background color.

Moreover, the system is devised to: comprise an operation means for operating the display device; a frame memory read means detecting input information from the aforementioned operation means, changing the display color of the auxiliary line image in accordance with the input information, and developing the same in the frame memory; and a storage means storing settings data about auxiliary line image display colors; and, with respect to the input information from the aforementioned operation means, to take the background color or luminance level of the auxiliary line image as well as the display color or luminance level of the auxiliary lines to be adjustable; and store the present settings data in the aforementioned storage means to hold the settings state thereof.

In addition, the system comprises: an operation means for operating a display device; a frame memory read means detecting the input information from the aforementioned operation means, modifying the display intervals between the auxiliary lines of an auxiliary line image in accordance with the input information, and developing the same in frame memory; and a storage means storing the settings data of the auxiliary line display intervals of the auxiliary line image; and is devised to take the interval between auxiliary lines of the auxiliary line image to be adjustable with respect to the input information from the aforementioned operation means, store the present settings data in the aforementioned storage means, and hold the settings state thereof.

Moreover, the system comprises: an auxiliary line image storage means having pre-stored an auxiliary line image with a plurality of shapes; an operation means for operating a display device; a frame memory read means detecting the input information from the aforementioned operation means, reading out the auxiliary line image data selected from the aforementioned auxiliary line image storage means in accordance with the input information, and developing the same in frame memory; and a storage means storing selected information about auxiliary line image data that have been selected from the auxiliary line image storage means; and is devised, with respect to the input information from the aforementioned operation means, to take the same to be selectively displayable from a pre-stored auxiliary line image, store the present selected information in the aforementioned storage means to hold the settings state thereof.

Also, the system comprises: an image transformation means carrying out auxiliary line image size enlargement or reduction; and a frame memory read control means controlling the positions of reads to the frame memory and controlling the display positions of the auxiliary line image; and is devised, with respect to the input information from the aforementioned operation means, to modify, and take to be displayable, the auxiliary line size and display position that had been pre-stored, and store the present selected information in the aforementioned storage means to hold the settings state thereof.

In addition, in a display device provided with: a light source provided with a light adjusting means adjusting the quantity of light of the display image; a fan targeting the tracking of changes in the aforementioned quantity of light and the carrying out of the cooling of a heat generation block; and a fan drive circuit driving the aforementioned fan; the system is devised to increase or decrease the quantity of light of the display image and make the rotation rate of the aforementioned fan track and control the changes in the aforementioned quantity of light during auxiliary line image display, in conjunction with the auxiliary line image.

Also, in a display device provided with a function of implementing distortion correction by means of transforming an image displayed on the display device, the system is devised so that, in the image displayed on the recording facility, the spaces between the dashes constituting the auxiliary line are set so that the dashes of the auxiliary lines of the auxiliary line image do not join to become a solid line, even in the case where distortion correction has been carried out.

Moreover, in a display device provided with a function of implementing distortion correction by means of transforming an image displayed on the recording facility, the system is devised so that, in conjunction with the amount of distortion correction, the spaces between dashes are adjusted so that the dashes of an auxiliary line of the auxiliary line image do not joint to form a solid line, in the image displayed on the recording facility.

In addition, in a display device comprising: an auxiliary line image storage means having pre-stored data about an auxiliary line image with a plurality of shapes; an OSD (On Screen Display) circuit part displaying the auxiliary lines; an image synthesis circuit weighting auxiliary line image data that are output from the OSD (On Screen Display) circuit part and display image data; an auxiliary line image display control part reading out auxiliary line image data from the auxiliary line image storage means, setting the aforementioned auxiliary line image data in the OSD circuit part, and controlling, so as to make be displayed, the desired auxiliary line image from the OSD circuit part; and a means displaying the image; the system is devised so that: the auxiliary lines are displayed weighted in the display image; the auxiliary lines are constituted by dashes; and the display of the dashes is carried out so as to move, at fixed time intervals or arbitrary time intervals, the dash display areas of the aforementioned auxiliary lines on the trajectory of the figure described by the aforementioned auxiliary lines.

Further, the system is devised, in a display device comprising a frame memory developing a prescribed auxiliary line image as a display image and a means of reading out and displaying the image data developed in the aforementioned frame memory; so that: the aforementioned auxiliary line image is constituted by background color and dashed auxiliary lines having pixels which have luminance or color that is different from that of the background color and pixels with have nearly identical luminance or color to that of the background color; and, with respect to an arbitrary position of the lines described by the aforementioned auxiliary lines, the aforementioned auxiliary line image is displayed with dashes by displaying the aforementioned dash display areas, at arbitrary time intervals.

Moreover, the system is devised to: comprise a light source provided with a light adjusting means adjusting the quantity of light of a display image; a fan carrying out the cooling of a heat generation block; and a fan drive circuit driving the aforementioned fan; and, during auxiliary line image display, to increase or decrease the quantity of light of the display image, with respect to an auxiliary line image, and, by associating it with a change in the aforementioned quantity of light, control the rotation rate of the aforementioned fan.

Also, the system is devised so as to comprise a distortion correction function correcting distortion by transforming an image displayed on a recording facility and so that, after execution of the aforementioned distortion correction function, the dashes of the aforementioned auxiliary lines are displayed with prescribed dash spacing.

In addition, the system is devised so as to comprise a distortion correction function correcting distortion by transforming an image displayed on a recording facility and so that, corresponding to the amount of distortion correction, the dashes of the aforementioned auxiliary lines are displayed with prescribed spacing.

Also, in a display device comprising: an auxiliary line image storage means having pre-stored data about an auxiliary line image with a plurality of shapes; an OSD (On Screen Display) circuit part displaying the auxiliary lines; an image synthesis circuit weighting auxiliary line image data that are output from the OSD (On Screen Display) circuit part and display image data; an auxiliary line image display control part reading out auxiliary line image data from the auxiliary line image storage means, setting the aforementioned auxiliary line image data in the OSD circuit part, and controlling, so as to make be displayed, the desired auxiliary line image from the OSD circuit part; and a display means displaying the image; the system is devised so that: the auxiliary line is displayed weighted in the display image; the auxiliary line is constituted by dashes and, with respect to an arbitrary position of the line described by the aforementioned auxiliary line, is displayed with dashes at arbitrary time intervals, by displaying the aforementioned dash display areas.

According to the present invention, it is possible to furnish an image display device that, more than conventionally, reduces the image persistence (burn-in) of display devices and makes possible the display of auxiliary lines in an identical position. In addition, it is possible, more than conventionally, to reduce image persistence (burn-in) of display devices without adding special circuits and make an implementation thereof at low cost.

DESCRIPTION OF THE EMBODIMENTS

Hereinafter, an explanation will be given regarding the best mode of the present invention, using the drawings. Further, in each of the diagrams mentioned hereinafter, elements having common functions are designated with like reference numerals, and, regarding elements which have already been explained, the explanation thereof will be omitted.

1. The First Embodiment

Figure 1:
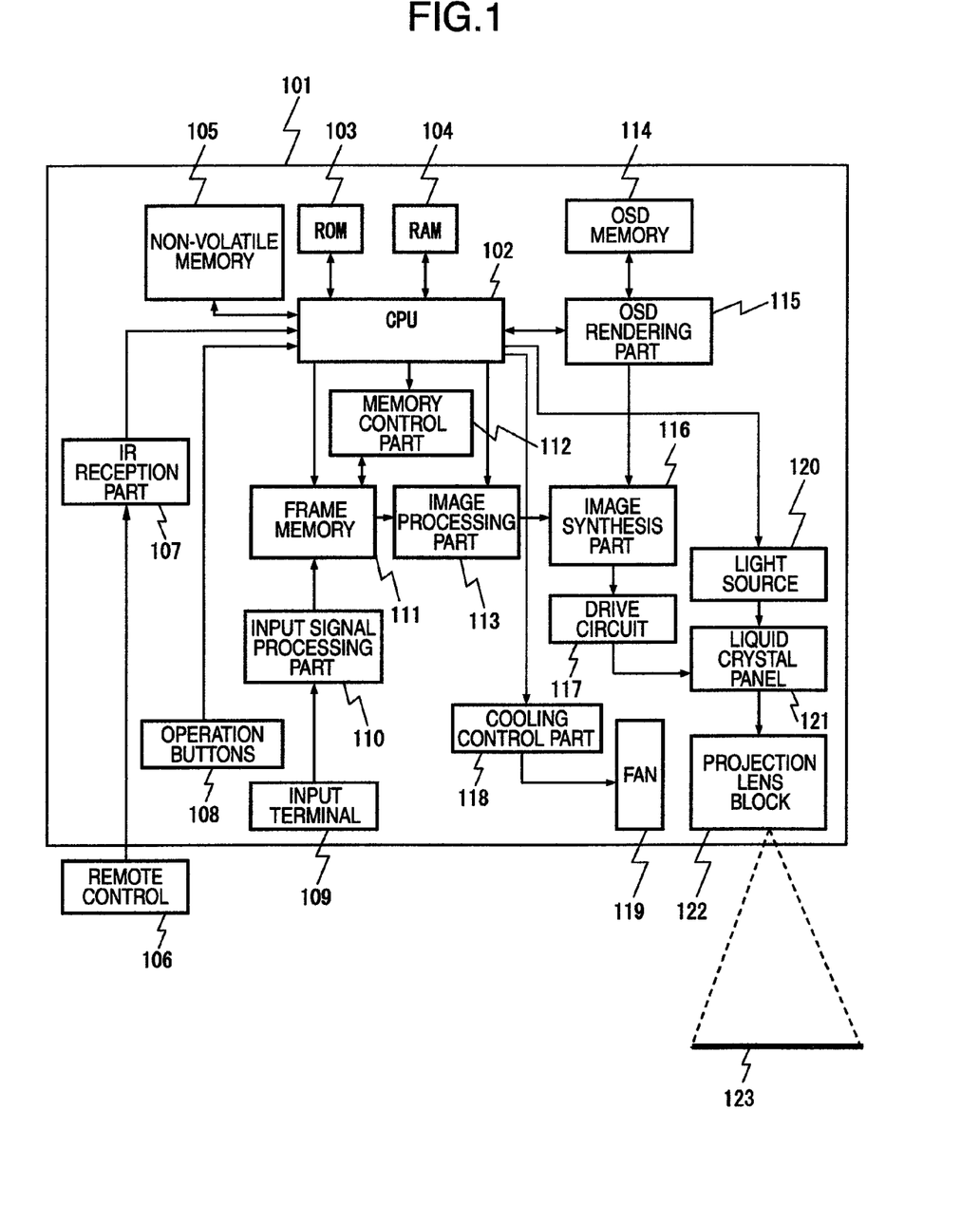
FIG. 1 is a block diagram of a projection type image display device.

FIG. 1 is a block diagram of a projection type image display device exhibiting Embodiment 1. In FIG. 1, ref. 101 is a projection type image display device, 109 is an input terminal into which a (not illustrated) video signal is input, 110 is an input signal processing part carrying out prescribed signal processing with respect to video signals input from input terminal 109, 111 is a frame memory temporarily storing video signals output from input signal processing part 110, 112 is a memory control part controlling reads to and from the frame memory, 113 is an image processing part carrying out scaling such as image enlargement and reduction as well as geometric distortion correction with respect to video signals read from the frame memory, 102 is a Central Processing Unit (below abbreviated as "CPU") carrying out arithmetic control of the whole projection type image display device, 103 is a Read Only Memory (including a Flash ROM and below abbreviated as "ROM") storing a program controlling CPU 102 and a processing program for generating auxiliary line image data or auxiliary line images for displaying auxiliary lines, 104 is a Random Access Memory (RAM) storing arithmetic results etc. used when the CPU is executing the program, 105 is a non-volatile memory storing selected information et cetera about a displayed auxiliary line image (below abbreviated as "non-volatile memory"), 115 is an OSD rendering part generating auxiliary line images and (not illustrated) adjustment menus on the basis of control from the CPU, 114 is an OSD memory in which are stored image data such as menu screens, fonts, and auxiliary line image auxiliary lines displayed with the OSD rendering part, 116 is an image synthesis part synthesizing image data output from the image processing part and OSD images output from the OSD rendering part, 117 is a drive circuit driving a liquid crystal panel, being a display element, on the basis of video data synthesized from video data and OSD images in the image synthesis part, 120 is a light source for displaying images which converts random polarized light into straight polarized light by means of a (not illustrated) polarization conversion element, irradiates light separated into the three colors red, green, and blue by means of a (not illustrated) dichroic mirror, and is provided with a function of adjusting the quantity of light, 121 is a liquid crystal panel controlling the transmitted quantity of light irradiated form the light source, 122 is a projection lens block magnifying and projecting images synthesized and generated from light transmitted through the liquid crystal panel, 123 is a screen reflecting projected images, 119 is a fan for cooling heat-generating components (below called "fan"), 118 is a cooling control part controlling the rotation rate of fan 119, 108 are operation buttons consisting of a plurality of buttons arranged on a cabinet of projection type image display device 101, 106 is a remote control (below called a "remote control") remotely controlling the projection type image display device using an infrared remote control signal (below abbreviated as a "remote IR signal"), and 107 is an IR light reception part receiving remote IR signals from remote control 106.

Figure 2:
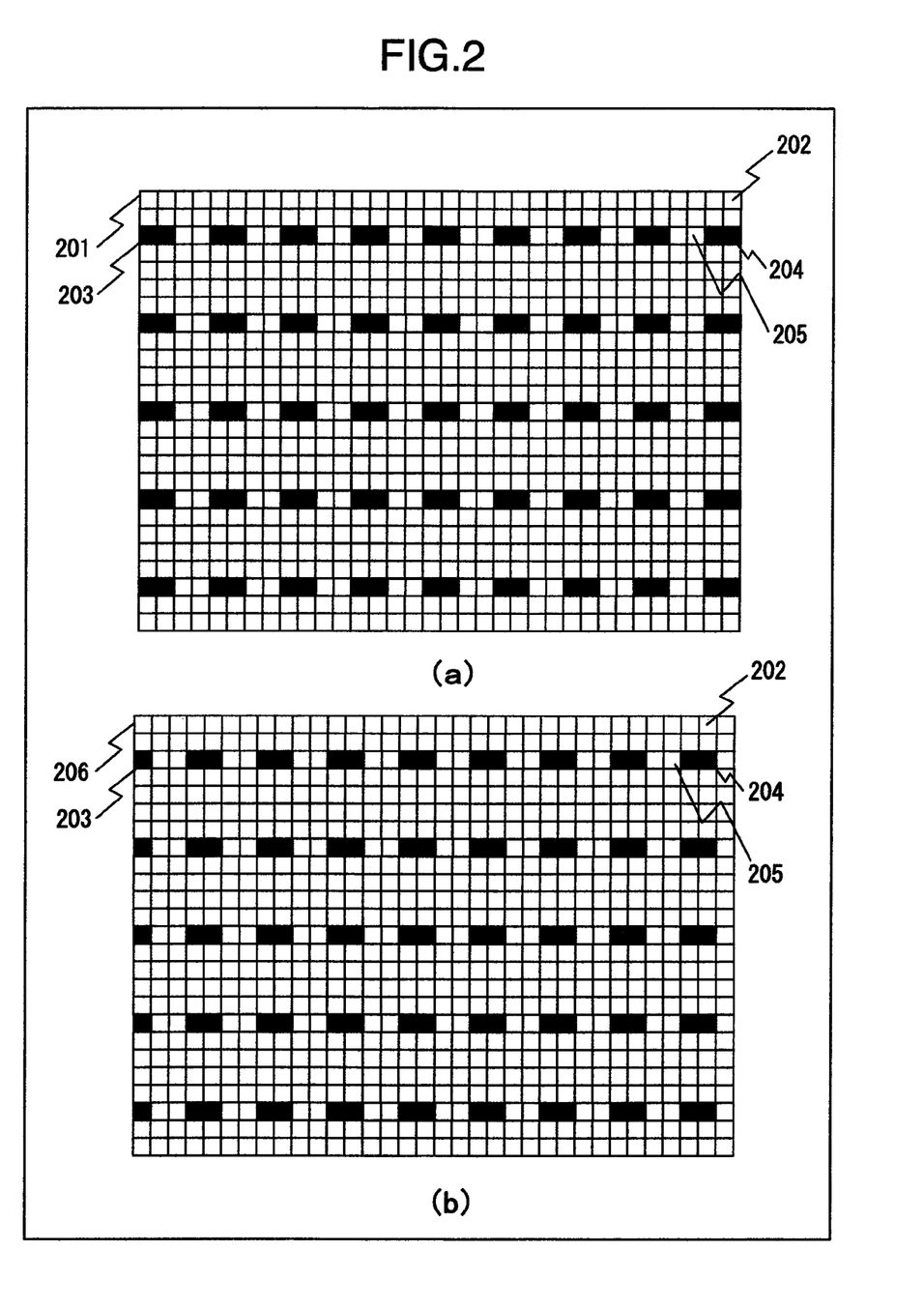
FIG. 2 is diagram showing auxiliary line images.

FIG. 2 is an example of displayed auxiliary line images associated with the present invention. In FIG. 2, ref. 201 is an auxiliary line image, 202 shows an image pixel which a constituent element of the auxiliary line image, 203 is an auxiliary line, 204 is a pixel whose luminance or color differs from that of the background color constituting the auxiliary lines, and 205 is a pixel whose luminance or color is the same as that of the background color constituting the auxiliary lines. Auxiliary line image 201 is an auxiliary line image which, given an auxiliary line 203 being a horizontal line which has two pixels having a luminance or color that differs from that of the background color and two pixels having a luminance or color that is the same as that of the background color alternately arranged in the horizontal direction, has five horizontal auxiliary lines of the aforementioned constitution. The pixels other than those of the auxiliary lines are background pixels which have the same luminance or color.

FIG. 2-(a) is a display image occurring at an arbitrary time while an auxiliary line image is being displayed and auxiliary line image 206 of FIG. 2-(b) shows an auxiliary line image displayed subsequently after displaying FIG. 2-(a), after a fixed time or after an arbitrary time, and is an image in which the auxiliary lines have been moved one pixel in the left direction.

Figure 3:
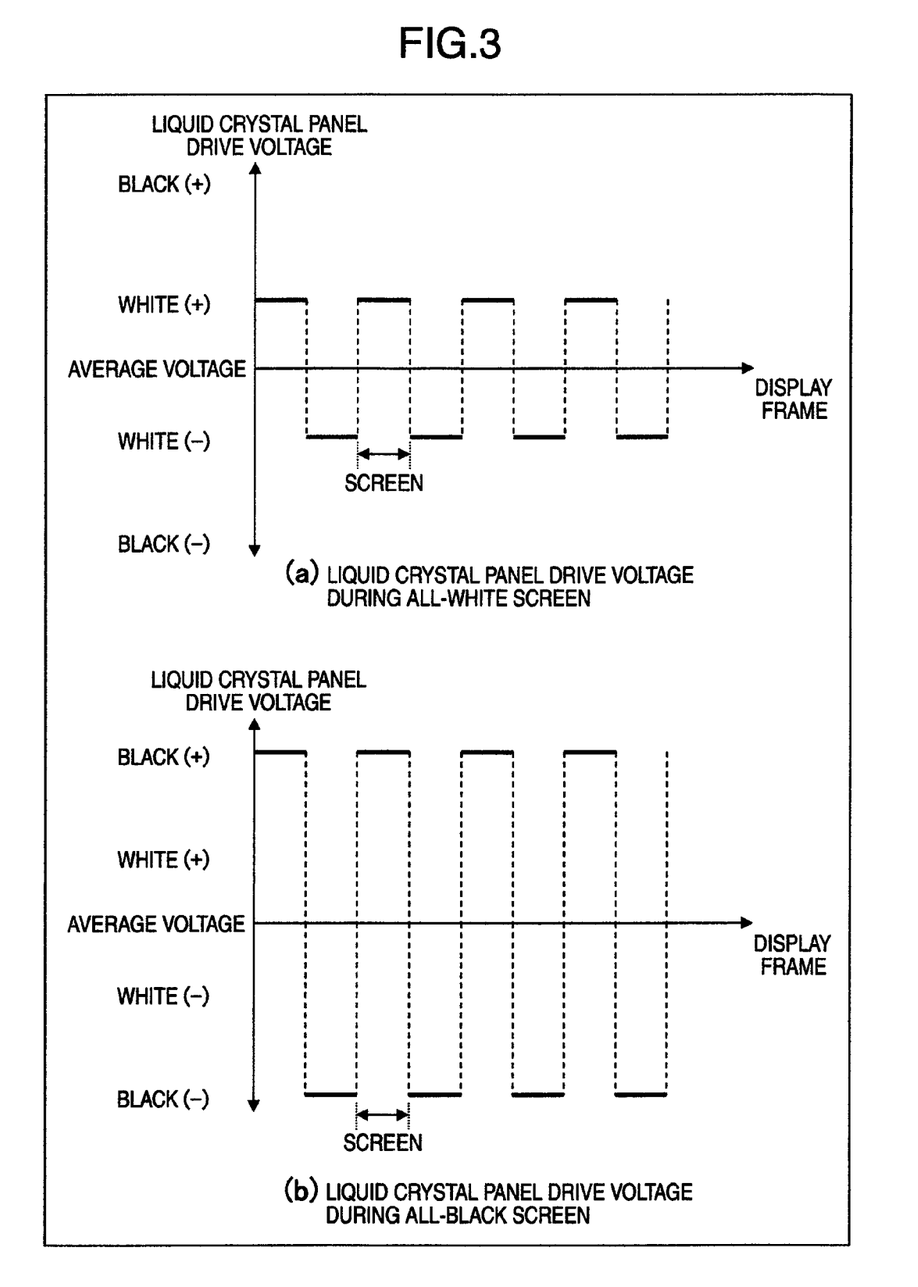
FIG. 3 is diagram explaining the drive control of a liquid crystal panel.

FIG. 3 is a diagram showing timing charts of the control voltage impressed on the liquid crystal panel from the drive circuit. The liquid crystal panel used in the present embodiment controls the transmitted amount of the irradiated light by applying a voltage to a group of oriented liquid crystals and changing the molecular axis of the liquid crystal molecules by means of the present impressed voltage. And then, in order to prevent degradation in liquid crystal quality, it is controlled with an inversion drive to invert the voltage for each fixed period.

FIG. 3-(a) shows the impressed voltage with respect to an arbitrary pixel within a liquid crystal panel during all-white display and shows the fact of inverting and impressing the impressed voltage for each screen. Moreover, FIG. 3-(b) shows the impressed voltage with respect to an arbitrary pixel within a liquid crystal panel during all-black display and shows the fact of inverting and impressing the impressed voltage for each screen.

Next, there will be a mention regarding the operation.

In ROM 103, there are pre-stored four types of auxiliary line images, the auxiliary line image of FIG. 2-(a), the auxiliary line image of FIG. 2-(b) in which the auxiliary lines of FIG. 2-(a) have been moved one pixel leftward in the horizontal direction, an auxiliary line image (not illustrated) in which the auxiliary lines of FIG. 2A have been moved two pixels leftward in the horizontal direction, and an auxiliary line image (not illustrated) in which the auxiliary lines of FIG. 2-(a) have been moved three pixels leftward in the horizontal direction. The aforementioned auxiliary line image data are constituted by the same number of pixels as the number of pixels of the liquid crystal panel, one pixel of an auxiliary line image corresponding one-to-one to a pixel of the liquid crystal panel.

CPU 102 carries out processing corresponding, respectively, to a (not illustrated) button out of operation buttons 108 or a remote IR signal received via IR reception part 107. In case there is input a signal of an operation button associating an auxiliary line display, CPU 102, via memory control part 112, discontinues the read to frame memory 111 of the video signals that are output from input signal processing part 110 and permits a read to frame memory 111 from CPU 102.

Next, CPU 102 reads out the pre-stored auxiliary line image data of FIG. 2-(a) from ROM 103 and carries out a development of the same and a read to frame memory 111. The auxiliary line image read into frame memory 111 is read to image processing part 113, is scaled to an image size corresponding to the pixel number of liquid crystal panel 121 in image processing part 113, and is input to drive circuit 117 via image synthesis part 116. On the basis of the input image data, drive circuit 117 controls and impresses the impressed voltage corresponding to each pixel of liquid crystal panel 121, as shown in FIG. 3. As for the light irradiated from light source 120, the amount of transmitted light is controlled in liquid crystal panel 121 by means of the present control, the transmitted light is irradiated on screen 123 via projection lens block 122 to display the auxiliary line image on screen 123.

Since the auxiliary line images developed and read to frame memory 111 have the same level of pixels as liquid crystal panel 121, a pixel of an auxiliary line image corresponds one-to-one to a pixel of liquid crystal panel 121, so a pixel 204 whose luminance or color differs from that of the background color is mapped onto a liquid crystal cell with an identical pixel position within the display area of liquid crystal panel 121 and a voltage corresponding to the luminance or color of pixel 204 is impressed.

Next, after displaying auxiliary line image 201 of FIG. 2A, CPU 102 measures the time with a (not illustrated) timer and after a fixed time, or an arbitrary time, has elapsed, reads the data of auxiliary line image 206 of FIG. 2-(b) from ROM 103, carries out a development of the same in frame memory 111 and a read thereto. As a result, auxiliary line image 206 of FIG. 2-(b) is displayed on the screen and, as for pixel 204 whose luminance or color differs from that of the background color, it comes about that the cell on the left horizontal side, in the liquid crystal panel controlled during the display of the image of FIG. 2-(a), is controlled with a voltage corresponding to the luminance or color of pixel 204, and, moreover, it comes about that the controlled cell corresponding to pixel 204 during the display of the image of FIG. 2-(a) has impressed on it a voltage corresponding to the luminance or color of the right side of pixel 204 and is controlled therewith.

As stated above, by displaying the four types of auxiliary line images in order, an identical pixel of liquid crystal panel 121 is controlled so that a voltage with equal positive and negative levels that differ from those of the background color pixels is not impressed continually.

By means of the present control, the residual DC voltage component is reduced, image persistence (burn-in) is suppressed, and it is made possible to display an auxiliary line in an identical position.

In the present embodiment, an explanation was given using a means storing auxiliary images to be displayed as pre-stored image data in ROM 103, but it is also acceptable to store in ROM 103 a program generating a displayed auxiliary image from data in which a displayed auxiliary image is divided up into background luminance or color, as well as the luminance or color, positional coordinates, and intervals of the auxiliary lines and the aforementioned displayed auxiliary image data; generate a display auxiliary image by means of the program whereby CPU 102 generates the aforementioned displayed auxiliary images; and develop the same in frame memory 111, and read thereto, to display the auxiliary image. In addition, it is also acceptable to effectuate control so as to individually update the update time of each auxiliary line.

2. The Second Embodiment

Figure 4:
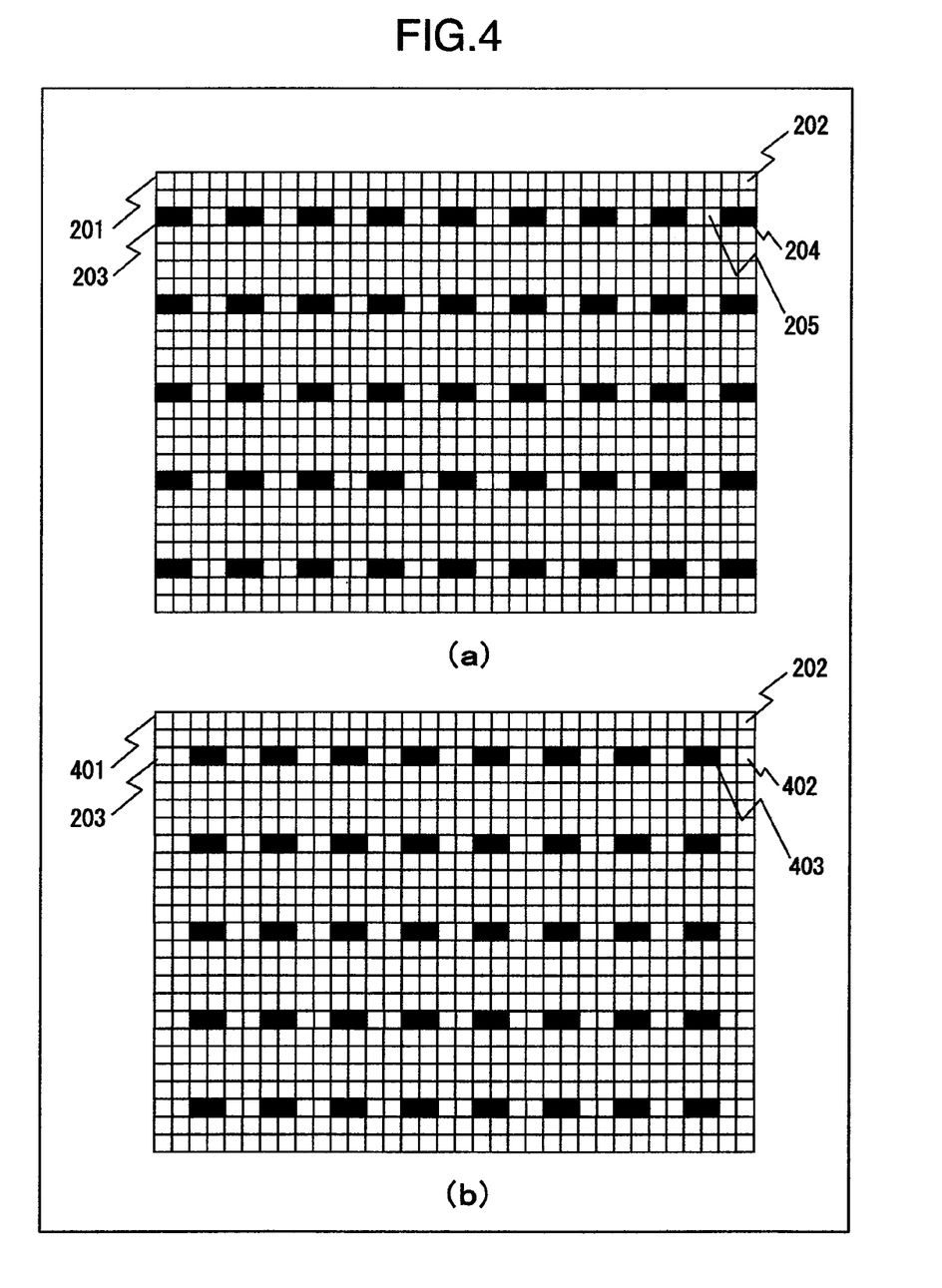
FIG. 4 is diagram explaining a display method of a registered auxiliary line image display.

FIG. 4 are diagrams explaining a display method for registered auxiliary line image display associated with the present invention. In FIG. 4B, 401 is an auxiliary line image in which the display color of pixel 204, whose luminance or color differs from the background color being a constituent element of auxiliary line 203 of auxiliary line image 201, is taken to have the same luminance or color as that of the background color and pixel 205 is taken to have a display color whose luminance or color differs from the background color of pixel 204.

Next, there will be a mention regarding the operation.

In ROM 103, auxiliary line image 201 and auxiliary line image 401 are pre-stored. CPU 102 carries out processing corresponding, respectively to a (not illustrated) button out of operation buttons 108 or a remote IR signal received via IR reception part 107. In case an operation button associating an auxiliary line display is input, CPU 102, via memory control part 112, discontinues the read to frame memory 111 of the video signals that are output from input signal processing part 110 and permits a read to frame memory 111 from CPU 102, and CPU 102 reads pre-stored auxiliary line image 201 data from ROM 103, and carries out a development of the same in frame memory 111 and a read thereto.

Next, after displaying auxiliary line image 201, CPU 102 measures the time with a (not illustrated) timer and after a fixed time, or an arbitrary time, has elapsed, reads the data of auxiliary line image 401 from ROM 103, and carries out a development of the same in frame memory 111 and a read thereto.

By carrying out a repetition of the aforementioned processing during auxiliary line display, an identical pixel of the liquid crystal panel is controlled so that a voltage with equal positive and negative levels that differ from those of the background color pixels is not impressed continually, the residual DC voltage component of the liquid crystal cell is reduced, image persistence (burn-in) is suppressed and it is made possible to display an auxiliary line in an identical position.

3. The Third Embodiment

Figure 5:
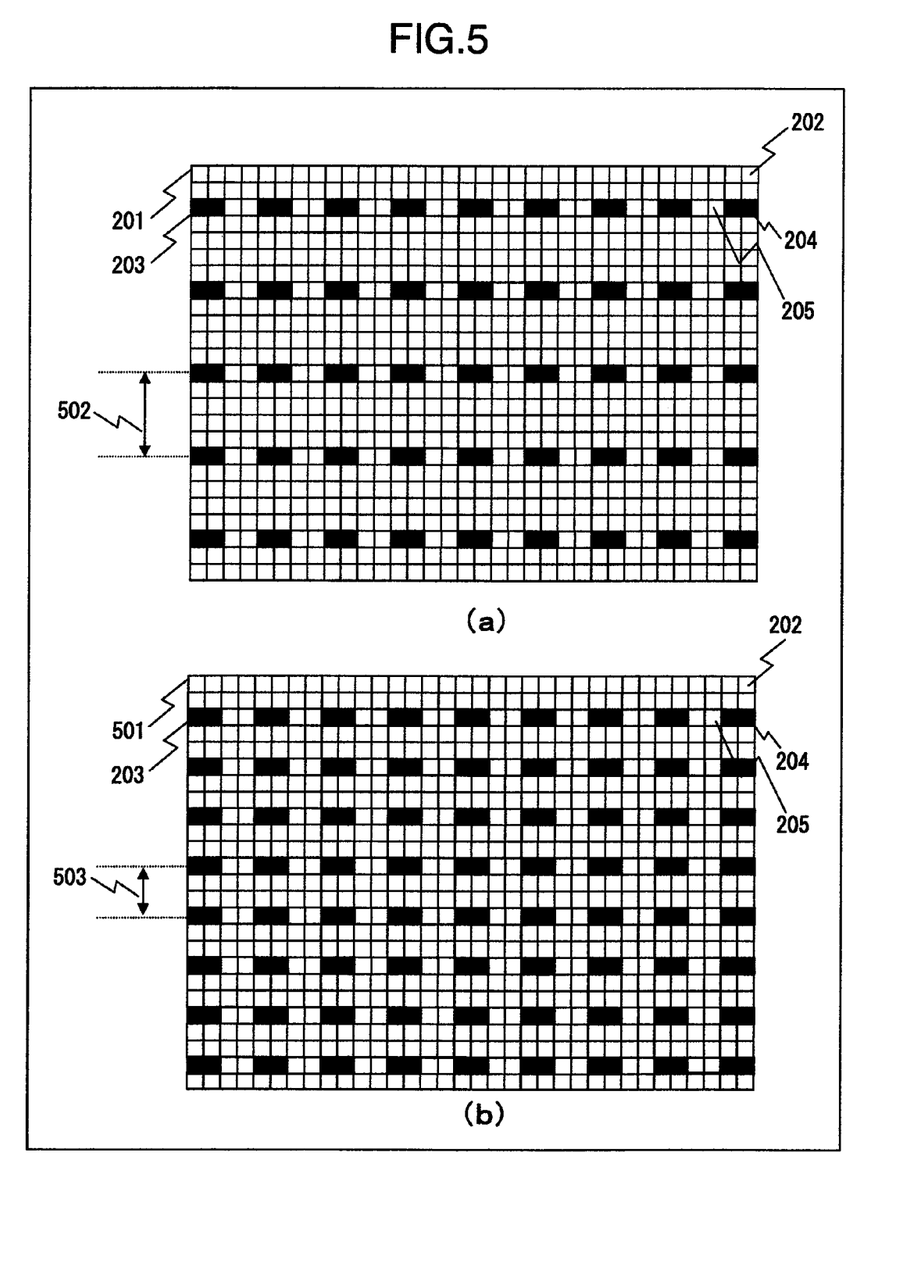
FIG. 5 is explanatory diagram in which the auxiliary line image intervals are adjusted.

FIGS. 5-(a) and (b) are explanatory diagrams in which the intervals in an auxiliary line image are adjusted. Ref. 502 indicates an auxiliary line interval. Ref. 501 is an auxiliary line image in which the auxiliary line interval is adjusted and 503 indicates the auxiliary line interval of auxiliary line image 501.

Figure 6:
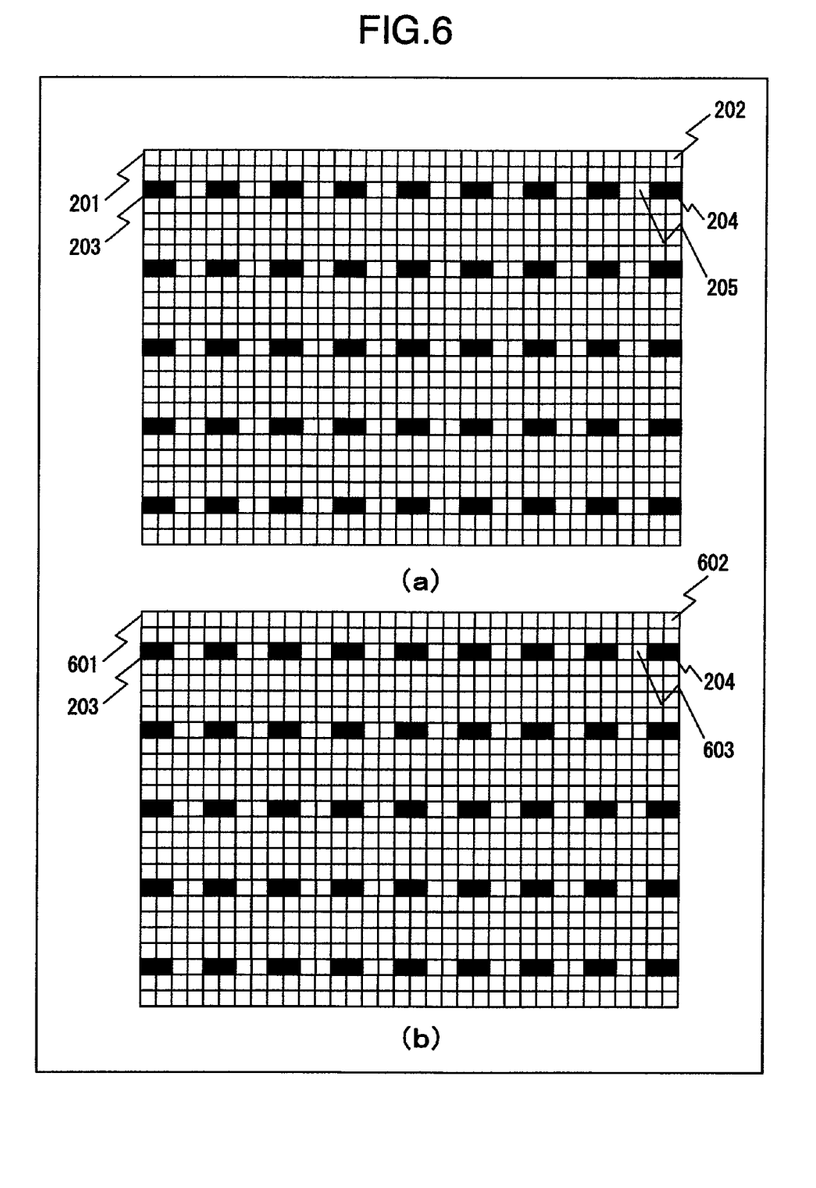
FIG. 6 is explanatory diagram in which the background color of an auxiliary line image is adjusted.

FIGS. 6-(a) and (b) are explanatory diagram in which the background color of the auxiliary line image is adjusted. Ref. 601 is an auxiliary line image in which the background color of auxiliary line image 201 has been adjusted, 602 shows one background color pixel in which the display luminance or color has been adjusted, and 603 shows a pixel whose luminance or color, in conjunction with an adjustment of the luminance or color of the background pixels, is the same as the background color and which is a constituent element of auxiliary line 203 whose display luminance or color is nearly the same as the background color.

Embodiment 3 will be explained using FIG. 1.

In the case where a signal corresponding to an operation of adjusting the background color luminance or color inside the auxiliary line image and the luminance or color of an auxiliary line is received through a (not illustrated) button out of operation buttons 108 or IR reception part 107, CPU 102 makes a (not illustrated) adjustment menu adjusting the aforementioned item be output from OSD rendering part 115, synthesizes it in image synthesis part 116 with the auxiliary line image read from frame memory 111 and processed in image processing part 113, and displays the same. The user operates an operation button 108 or remote control 106 in the aforementioned adjustment menu to adjust the aforementioned adjustment item. CPU 102 detects the aforementioned user input and, if what is concerned is an adjustment of the auxiliary line interval, e.g. in the case of detecting an adjustment of auxiliary line interval 502 to adjusted interval 503, transforms auxiliary line image 201 into auxiliary line image 501, and carries out a development of the same in frame memory 111 and a read thereto. Also, if what is concerned is an adjustment of the background luminance or color inside an auxiliary line image, it modifies the data of the pixels corresponding to the background of auxiliary line image 201 and carries out a development of the same in frame memory 111 and a read thereto, so that auxiliary line image 601 is displayed. Since the user can adjust the displayed auxiliary line image while checking it, the user can readily adjust the intended auxiliary line image. And then, after completion of the adjustment, CPU 102 stores the adjusted data in non-volatile memory 105 and, from the adjustment onward, CPU 102 operates to read the pre-stored auxiliary line image data from ROM 103 on the occasion of displaying the auxiliary line image, read the aforementioned adjustment data from non-volatile memory 105, transform the auxiliary line image or modify the display luminance or color on the basis of the present adjustment data, carry out a development of the same in frame memory 111, and cause it to be displayed.

4. The Fourth Embodiment

Figure 7:
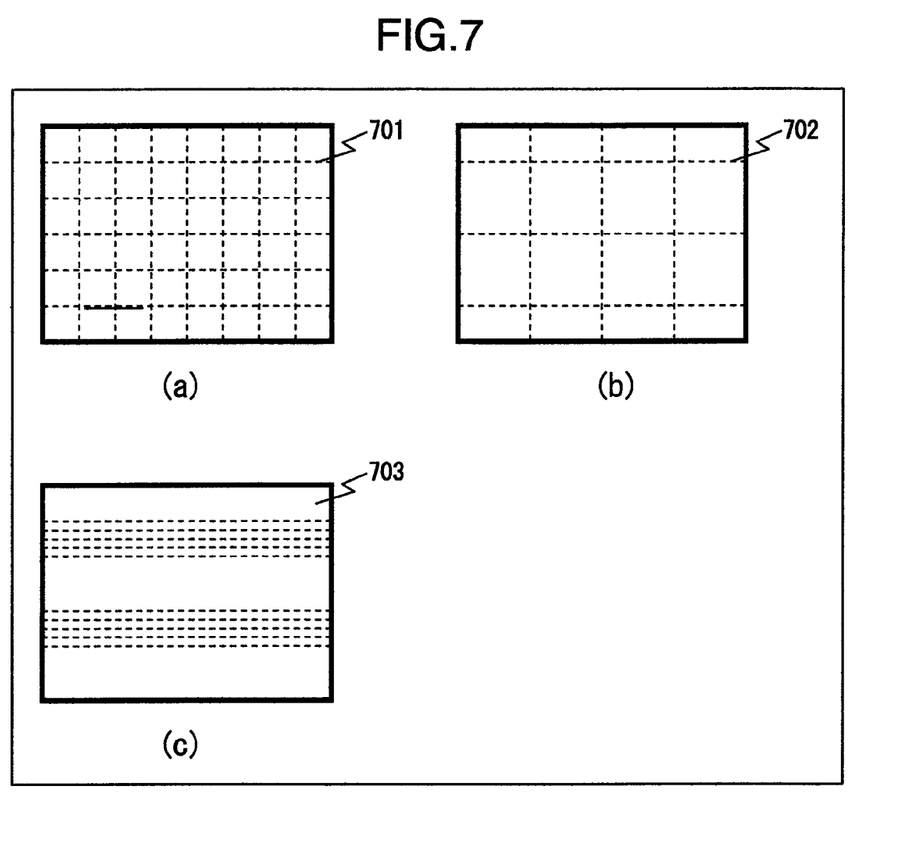
FIG. 7 is diagram showing an example of a plurality of auxiliary line images pre-stored in a ROM.

FIG. 7 shows an example of a plurality of auxiliary line images caused to be stored in ROM 103. Ref. 701 is a lattice auxiliary line image, 702 is a lattice auxiliary line image with wide intervals, and 703 is a 5-line auxiliary line image in which five auxiliary lines are coupled.

Embodiment 4 will be explained using FIG. 1.

The data of a plurality of auxiliary lines are caused to be pre-stored in ROM 103 and, in case a signal corresponding to an operation of selecting an auxiliary line image to be displayed is received through a (not illustrated) operated button out of operation buttons 108 or IR reception part 107, CPU 102 makes a (not illustrated) selection menu selecting a plurality of auxiliary line images caused to be pre-stored in ROM 103 be output from OSD rendering part 115, the menu being synthesized in image synthesis part 116, with the display image read from frame memory 111 and processed in image processing part 113, and displayed. In the aforementioned selection menu, the user operates an operation button 108 or remote control 106 to select the auxiliary line image to be displayed. CPU 102 detects the input of the aforementioned user operation, reads the auxiliary line image data to be displayed from ROM 103, carries out a development of the same in frame memory 111 and a read thereto, and displays the auxiliary line image. Also, CPU 102 stores, in non-volatile memory 105, auxiliary line image identification data uniquely allocated to the selected auxiliary line image data and, from the selection onward, CPU 102, on the occasion of displaying the auxiliary line image, reads the aforementioned auxiliary line image identification data from non-volatile memory 105 and selects and displays auxiliary line image data corresponding to the aforementioned auxiliary line identification data from the data of a plurality of auxiliary line images caused to be stored in ROM 103.

5. The Fifth Embodiment

Figure 8:
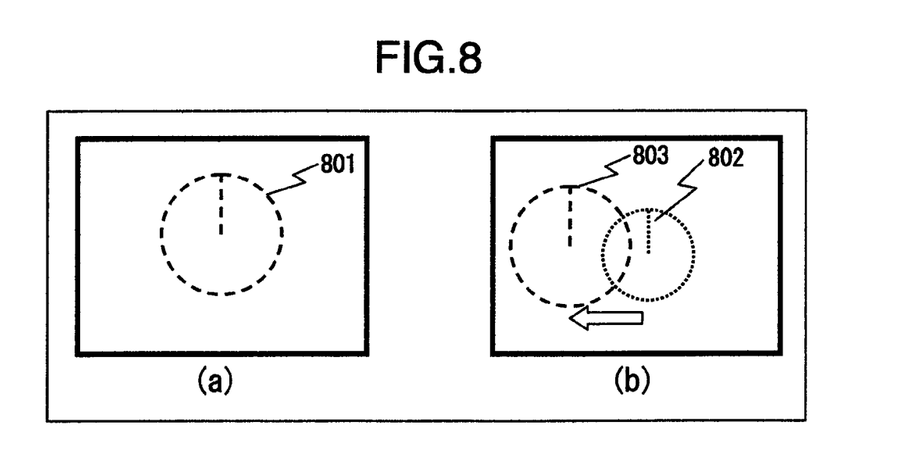
FIG. 8 is explanatory diagram of the operation of adjusting the display size and position of an auxiliary line image.

FIGS. 8-(a) and (b) is explanatory diagram of the operation of adjusting the display size and position of an auxiliary line image.

Embodiment 5 will be explained using FIG. 1.

The data of a plurality of auxiliary lines are caused to be pre-stored in ROM 103 and, in case a signal corresponding to an operation of displaying an auxiliary line image to be displayed is received through a (not illustrated) operated button out of operation buttons 108 or through IR reception part 107, CPU 102 reads the auxiliary line identification data of auxiliary line image 801 to be displayed from non-volatile memory 105, reads the corresponding auxiliary line image 801 from ROM 103 to display the same. Next, the user transmits a signal corresponding to an operation of adjusting the size or position of the display auxiliary line image with an operated button (not illustrated) out of operation buttons 108 or remote control 106. CPU 102 detects the present signal and causes an adjustment menu (not illustrated) adjusting the size or position of the display auxiliary line image to be output from OSD rendering part 115 to display the same. The user adjusts the size or position of the display auxiliary line image in the aforementioned adjustment menu. As for the adjustment of the size of display auxiliary line image 801, the size of the auxiliary line image is transformed by CPU 102 into display auxiliary line image 802 and is developed in frame memory 111. Moreover, in the case of changing the position of the image data of display auxiliary line image 801, CPU 102 operates to modify the position of reading to frame memory 111 so that an auxiliary line image 803, in which the display image position is moved, is displayed, and carries out a read thereto. Also, CPU 102 stores the adjustment data of the adjusted size or position in non-volatile memory 105 and, on the occasion of displaying the aforementioned auxiliary line image 801, CPU 102 reads the size or position data of the aforementioned auxiliary line image from non-volatile memory 105 and, using the size or position data of the aforementioned auxiliary line image, determines the read starting position of frame memory 111 of the displayed auxiliary line image, together with transforming it to the adjusted size, to carry out a read of the transformed auxiliary line image data from the aforementioned read starting position.

6. The Sixth Embodiment

Embodiment 6 will be explained using FIG. 1.

In case a signal corresponding to an auxiliary line image display operation is received through an operated button (not illustrated) out of operation buttons 108 or from remote control 106 through IR reception part 107, CPU 102 reads the auxiliary line identification data from non-volatile memory 105, selects auxiliary line image data corresponding to the aforementioned auxiliary line image identification data from a plurality of auxiliary line image data caused to be stored in ROM 103, reads the aforementioned auxiliary line image data from ROM 103, and carries out a read to frame memory 111. In addition, CPU 102 outputs a light quantity adjustment signal to light source 120 so as to reduce the quantity of light of the light source and, with respect to fan 119 targeting the cooling of heat-generating parts generating heat in response to the quantity of light irradiated from light source 120, lowers the rotation rate of the aforementioned fan 119 through cooling control part 118 so that the fan rotation rate becomes one corresponding to the reduced quantity of light. Since the quantity of heat generation diminishes by reducing the quantity of light, and since the air flow of the fan targeting the cooling of the heat-generating parts diminishes, it is self-evident that it is possible to lower the rotation rate. By means of the present control, the glare is alleviated, together with reducing the noise of the fan.

7. The Seventh Embodiment

Figure 9:
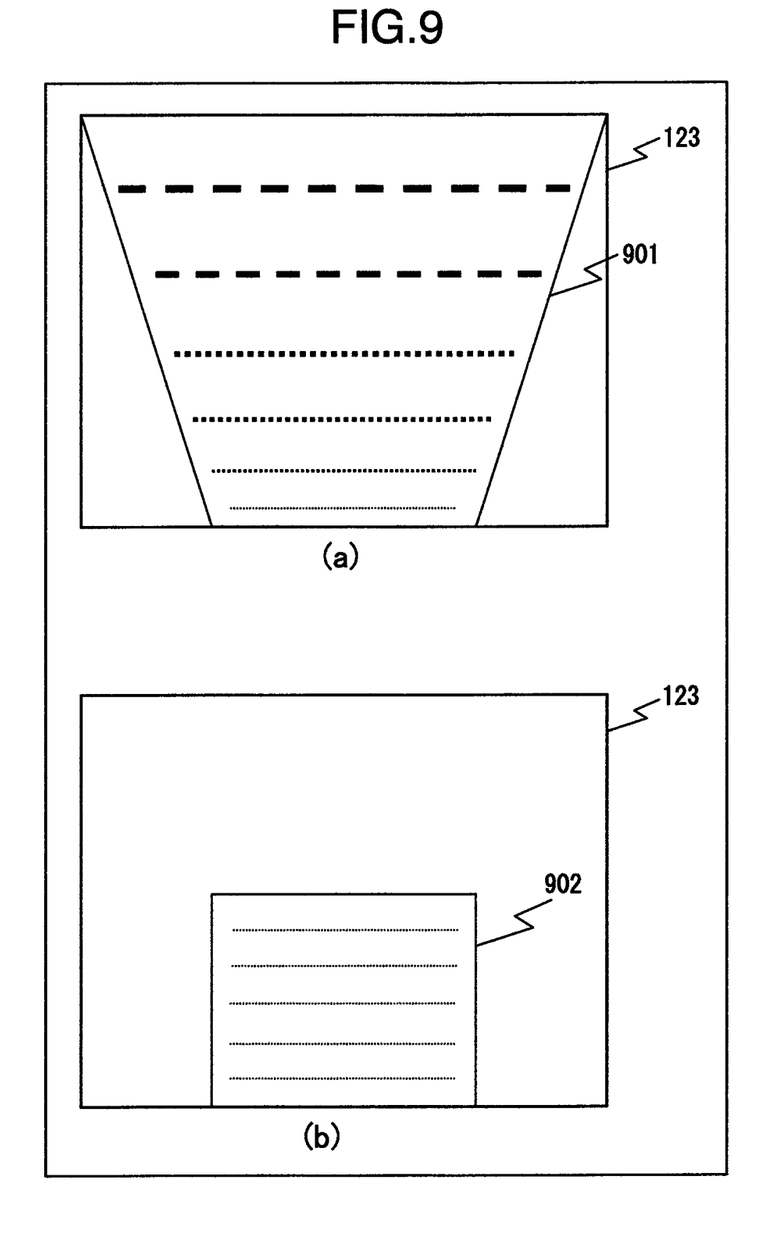
FIG. 9 is diagram showing projected images that are projected when a projection type display device is directed obliquely upward on a vertically positioned screen.

FIGS. 9-(*a*) and (*b*) are projected images that are projected when a projection type display device is directed obliquely upward on a vertically positioned screen. Ref. 901 is a projected image in which trapezoid correction has not been carried out and 902 is a projected image in which trapezoid correction has been carried out.

Figure 10:
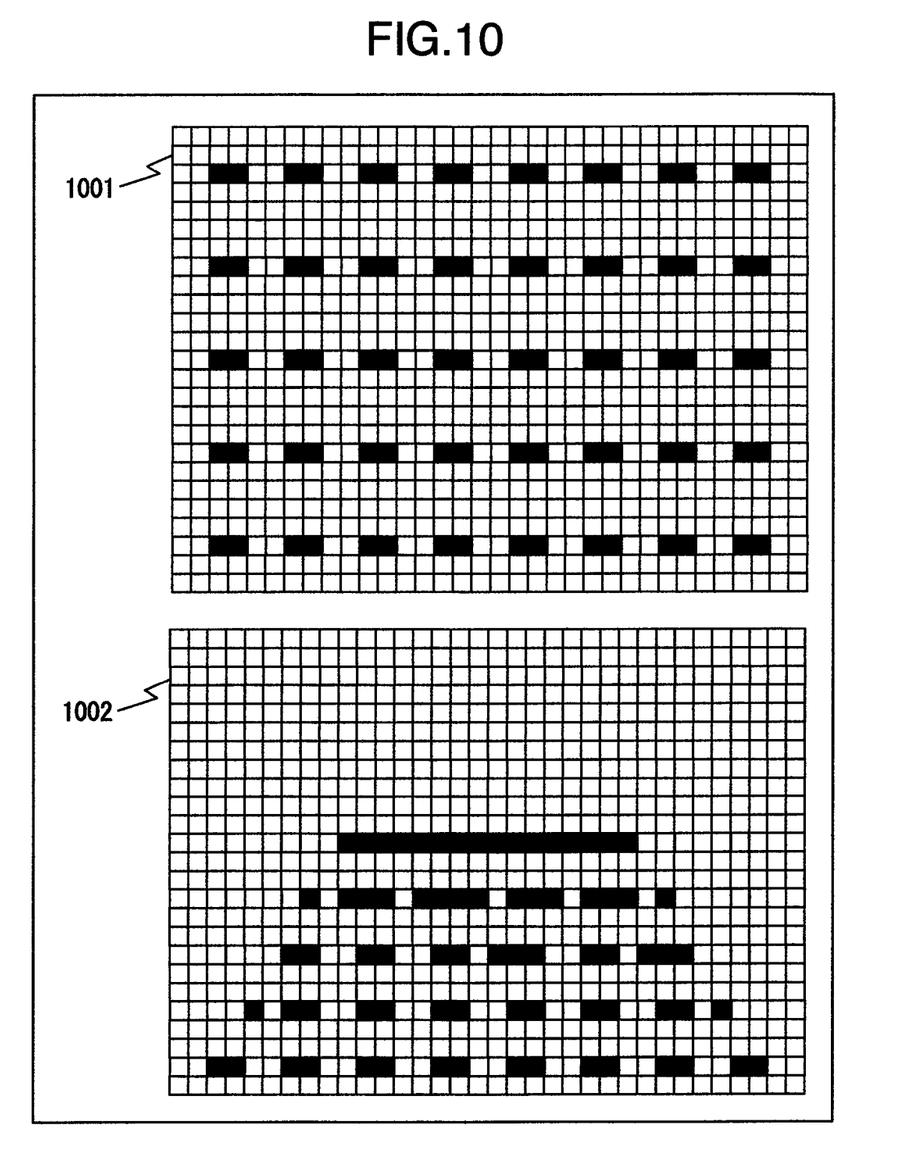
FIG. 10 is diagram showing auxiliary line images on a liquid crystal panel.

FIGS. 10-(*a*) and (*b*) are diagrams showing auxiliary line images on a liquid crystal panel. Ref. 1001 is an auxiliary line image on a liquid crystal panel in the case where trapezoid correction has not been carried out and 1002 is an auxiliary line image in the case where trapezoid correction has been carried out.

Figure 11:
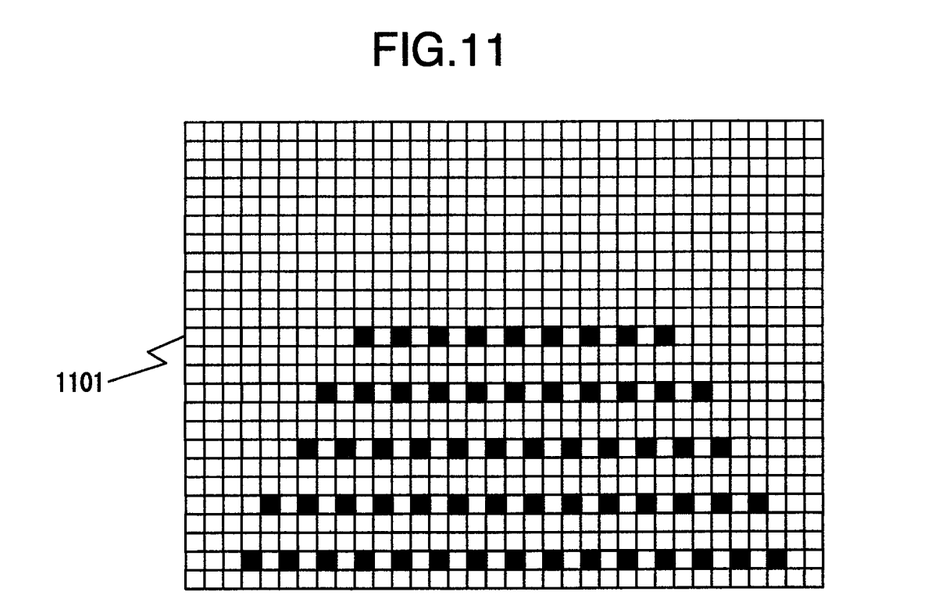
FIG. 11 is a diagram showing an auxiliary line image on a liquid crystal panel in the case of displaying auxiliary lines so that the auxiliary lines do not become solid lines, taking into account the amount of trapezoid correction.

FIG. 11 is a diagram showing an auxiliary line image on a liquid crystal panel in the case of displaying auxiliary lines so that the auxiliary lines do not become solid lines, taking into account the amount of trapezoid correction.

Embodiment 7 will be explained using FIG. 1.

Due to the tilt angle, with respect to screen 123, of the optical axis of the (not illustrated) projection lens inside projection lens block 122 of the projection type display device, there arises trapezoidal distortion in the projected image of the projection type display device. E.g., in the case of projecting the projection type display device obliquely upward on a vertically positioned screen, the image becomes one having the trapezoidal distortion of projected image 901. Because of this, it is common to have a device provided with a trapezoid correction function transforming this trapezoidal distortion on the liquid crystal panel into projected image 902. In order to correct the aforementioned trapezoidal distortion on liquid crystal panel 121, there is implemented an image transformation in image processing part 113 so as to inversely correct the aforementioned trapezoidal distortion and a projection on liquid crystal panel 121.

As for the auxiliary line image, in order to develop it in frame memory 111 and read it thereto, and to display it, in the aforementioned case of carrying out trapezoid correction, the image is transformed in image processing part 113 so as to inversely correct the aforementioned trapezoidal distortion. In the case where the dash spacing of the auxiliary lines of the auxiliary line image read to frame memory 111 is narrow, it is easily anticipated that an auxiliary line on liquid crystal panel 121 becomes a solid line. In this case, since it comes about that a voltage with equal positive and negative levels that differ from those of the background color pixels is impressed continually on an identical pixel, the result is that image persistence (burn-in) occurs.

In order to solve the aforementioned problem, taking into account the amount of trapezoid correction, the auxiliary lines of the auxiliary line image are generated with spacing such that the dashes of the auxiliary lines do not become a solid line, even with trapezoid correction. Alternatively, the system is devised so that, in response to the amount of trapezoid correction, the corresponding position on liquid crystal panel 121 of each dash of an auxiliary line is computed with a calculation, the dash spaces are determined so that the dashes do not join, a read of the auxiliary line image data to frame memory 111 is carried out, and it is prevented, even during trapezoid correction, that a voltage with equal positive and negative levels that differ from those of the background color pixels is impressed continually on an identical pixel on liquid crystal panel 121.

8. The Eighth Embodiment

Embodiment 8 will be explained using FIG. 1.

Auxiliary line image data are stored in OSD memory 114 and, with respect to OSD rendering part 115, CPU 102, during auxiliary line display, gives an instruction for displaying the auxiliary lines from auxiliary line data pre-stored in OSD memory 114, OSD rendering part 115 reads the specified auxiliary lines from OSD memory 114 and renders the auxiliary line image, and the lines are synthesized with the input image in image synthesis part 116 and displayed. In a projection type display device provided with trapezoid correction, it is also acceptable to arrange image synthesis part 116 before the (not illustrated) trapezoidal distortion correction part inside the image processing part and for the trapezoid correction processing to be carried out after synthesizing the input image and the output image of OSD rendering part 115.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type image display device for projecting and displaying an image on a recording surface of a recording facility, the projection type image display device comprising:
   a frame memory storing a prescribed auxiliary line image as a display image to be projected; and
   a means of reading out the image data from the frame memory and displaying the image data read out from the frame memory, wherein:
   the auxiliary line image, which is a guiding indication for recording on the recording surface of the recording facility, is constituted by background color and dashed auxiliary lines extending along a first direction, the dashed auxiliary lines being constituted by (i) dashes, which are pixels which have luminance or color that is different from that of the background color and (ii) pixels which have nearly identical luminance or color to that of the background color, a space between adjacent auxiliary lines is greater than a line width of the dashed auxiliary lines and the space is constituted by the background color; and
   the dashed auxiliary lines are written to the frame memory and are displayed so as to move dash display areas, at fixed time intervals or arbitrary time intervals, on a trajectory of a figure represented by the dashed auxiliary lines, the trajectory of the figure is displayed with other portions, which do not constitute a trajectory of a figure in the display image, in order to make the auxiliary line image be the guiding indication, the dashed auxiliary lines are displayed so as not to move the dash display areas on any position other than the trajectory of the figure, and the auxiliary line image as a whole is projected and displayed on an identical position with respect to a second direction perpendicular to the first direction on the recording surface of the recording facility.

2. The projection type image display device according to claim 1, wherein the dashed auxiliary lines is displayed such that, at the fixed time intervals or the arbitrary time intervals, for the dash display areas of the dashed auxiliary lines, pixel areas whose luminance or color differs from that of the background color are changed into a luminance or color that is nearly identical to that of the background color and pixel areas whose luminance or color is nearly identical to that of the background color are changed into a luminance or color that differs from that of the background color.

3. The projection type image display device according to claim 1, further comprising:
   an operation means for operating the projection type image display device;
   a frame memory read means for detecting input information from the operation means, for changing the display color of the auxiliary line image in accordance with the input information, and for storing the auxiliary line image with the changed display color in the frame memory; and
   a storage means for storing settings data about auxiliary line image display colors, wherein:
   with respect to the input information from the operation means, the background color or luminance level of the auxiliary line image as well as the display color or luminance level of the dashed auxiliary lines are taken to be adjustable, and
   present setting data are stored in the storage means to hold a setting state thereof.

4. The projection type image display device according to claim 1, further comprising:
   an operation means for operating a display device;
   a frame memory read means for detecting input information from the operation means, for modifying a display interval between the adjacent dashed auxiliary lines of the auxiliary line image in accordance with the input information, and storing the auxiliary line image with modified intervals of the dashed auxiliary lines in the frame memory; and
   a storage means for storing settings data of the display intervals of the auxiliary line image, wherein:
   the display interval between the dashed auxiliary lines of the auxiliary line image is taken to be adjustable with respect to the input information from the operation means, and
   present setting data are stored in the storage means to hold a setting state thereof.

5. The projection type image display device according to claim 1, further comprising:
   an auxiliary line image storage means for pre-storing a plurality of auxiliary line images with a plurality of shapes;
   an operation means for operating the projection type image display device;
   a frame memory read means for detecting input information from the operation means, for reading out one of the auxiliary line images selected from the auxiliary line image storage means in accordance with the input information, and for storing the one of the auxiliary line images in the frame memory; and
   a storage means for storing selected information about the one of auxiliary line images that has been selected from the auxiliary line image storage means, wherein:
   with respect to the input information from the operation means, the plurality of auxiliary line images are selectively displayed, and
   present selected information is stored in the storage means to hold a setting state thereof.

6. The projection type image display device according to claim 5, further comprising:
   an image transformation means for carrying out auxiliary line image size enlargement or reduction; and
   a frame memory read control means for controlling display positions of the auxiliary line image by controlling writing positions in the frame memory, wherein:
   with respect to the input information from the operation means, an auxiliary line size and a display position are modifiable, and
   present selected information is stored in the storage means to hold a setting state thereof.

7. The projection type image display device according to claim 1 further comprising:
   a light source provided with a light adjusting means for adjusting a quantity of light provided by the light source;
   a fan for cooling a heat generation block in accordance with changes in the quantity of light; and
   a fan drive circuit for driving the fan,
   wherein the quantity of light and a rotation rate of the fan are controlled in accordance with displaying the auxiliary line image.

8. The projection type image display device according to claim 1, wherein:
   the projection type image display device is configured to implement distortion correction by means of transforming an image displayed on the recording surface of the recording facility, and
   spaces between the dashes constituting the dashed auxiliary lines are set so that the dashes do not join to become a solid line, even in a case where distortion correction has been carried out.

9. The projection type image display device according to claim 1, wherein:
   the projection type image display device is configured to implement distortion correction by means of transforming an image displayed on the recording surface of the recording facility, and
   in conjunction with an amount of distortion correction, spaces between the dashes are adjusted so that the dashes do not joint to form a solid line, in the image displayed on the recording surface of the recording facility.

10. A projection type image display device for projecting and displaying an image on a recording surface of a recording facility, the projection type image display device comprising:
    an auxiliary line image storage means for pre-storing auxiliary line image data about an auxiliary line image, which is a guiding indication for recording on the recording surface of the recording facility, with a plurality of shapes;
    an OSD (On Screen Display) circuit for displaying the auxiliary line image;
    an image synthesis circuit for weighting auxiliary line image data that are output from the OSD (On Screen Display) circuit and for superimposing the weighted auxiliary line image with image data to be displayed;
    an auxiliary line image display control part for reading out auxiliary line image data from the auxiliary line image storage means, and for setting the auxiliary line image data in the OSD circuit part; and
    a means for displaying a superimposed image of the weighted auxiliary line image and image data, wherein:
    the auxiliary lines are constituted by dashes and extend along a first direction, a space between adjacent auxiliary lines is greater than a line width of the auxiliary lines, and the display of the dashes is carried out so as to move dash display areas displaying the dashes at fixed time intervals or arbitrary time intervals, on a trajectory of a figure represented by an entirety of the dashes, by changing the auxiliary line image data from the auxiliary line image storage means, the trajectory of the figure is displayed with other portions, which do not constitute a trajectory of a figure in the display image, in order to make the auxiliary line image be the guiding indication, the display of the dashes is carried out so as not to move the dash display areas on any position other than the trajectory of the figure, and the auxiliary line image is projected on an identical position with respect to a second direction perpendicular to the first direction on the recording surface of the recording facility.

\* \* \* \* \*